United States Patent

Sudo et al.

[11] Patent Number: 4,904,416
[45] Date of Patent: Feb. 27, 1990

[54] CEMENT SOLIDIFICATION TREATMENT OF SPENT ION EXCHANGE RESINS

[75] Inventors: Rey Sudo, Fukuoka; Norimitsu Kurumada, Ibaraki; Fukuzo Todo, Ibaraki; Masao Hara, Ibaraki; Kenzo Sauda, Yokohama, all of Japan

[73] Assignees: Kyushu Electric Power Co., Ltd., Fukuoka; JGC Corp., Tokyo, both of Japan

[21] Appl. No.: 223,961

[22] Filed: Jul. 26, 1988

[51] Int. Cl.$^4$ .................................................. G21F 9/16
[52] U.S. Cl. ..................... 252/628; 252/633; 210/751
[58] Field of Search ............... 252/628, 633; 210/751, 210/749; 106/90, 93, 94

[56] References Cited

U.S. PATENT DOCUMENTS

| | | | |
|---|---|---|---|
| 3,749,917 | 7/1973 | Kucherer | 252/628 |
| 4,235,738 | 11/1980 | Knotik et al. | 252/628 |
| 4,379,081 | 4/1983 | Rootham et al. | 252/628 |
| 4,483,789 | 11/1984 | Kunze et al. | 252/628 |
| 4,530,723 | 7/1985 | Smeltzer et al. | 252/628 |
| 4,585,583 | 4/1986 | Roberson et al. | 252/628 |
| 4,671,898 | 6/1987 | Hultgren | 252/628 |

FOREIGN PATENT DOCUMENTS

| | | | |
|---|---|---|---|
| 3027685 | 2/1982 | Fed. Rep. of Germany | 252/628 |
| 0020519 | 5/1981 | Japan | 252/628 |
| 0020520 | 5/1981 | Japan | 252/628 |
| 0128496 | 7/1984 | Japan | 252/628 |
| 0133498 | 7/1984 | Japan | 252/628 |
| 1086692 | 5/1986 | Japan | 252/628 |
| 1111499 | 5/1986 | Japan | 252/628 |

Primary Examiner—Howard J. Locker
Attorney, Agent, or Firm—Varndell Legal Group

[57] ABSTRACT

Disclosed is an improved process for cement solidification treatment for disposition of spent ion exchange resins exhausted from nuclear power plants.

The wet resin particles are centrifuged to remove free water therefrom and subjected to the pre-treatment of coating with a small amount of cement powder, and then, cement powder and water is added to the resin particles and the mixture is kneaded to form cement paste, which is cast in to a vessel for solidification.

The cast product contains much more resin particles and has improved water-resistability.

6 Claims, 2 Drawing Sheets

CEMENT SOLIDIFICATION TREATMENT OF SPENT ION EXCHANGE RESINS

BACKGROUND OF THE INVENTION

1. Field of the Invention

The present invention relates to an improved cement solidification treatment of radioactive spent ion exchange resins exhausted from nuclear power plants.

2. State of the Art

As one of the means for solidification and disposition of spent ion exchange resins exhausted from, for example, a PWR type nuclear power plant, which was used for treating concentrated boric acid-containing waste water, there is used "plastics solidification". The plastics solidification achieves a higher volume reduction, but has drawbacks of the complicated process and the high treatment cost.

As a simple and less expensive solidification process, "cement solidification" has been tried. the weakness of this process is the low volume-reduction. The content of the resin particles in the solidified products is 5–10% (dry basis), and the bulk volume of the resin which can be packed in one 200-liters steel drum can ranges from only 35 to 70 liters (in terms of volume ratio, 17.5–35%) at highest. This limitation is inevitable because a cement-solidified product with a higher content of spent ion exchange resins will expand and break down when it is immersed in water.

It is considered that the expansion of the solidified product is due to expansion of the resin particles, and that the expansion of the resin particles is caused by swelling due to absorption of water and adsorption of soluble contents of the cement.

In order to improve the situation, efforts have been made to improve the properties of the solidified products. For instance, addition of caustic soda in an amount of 3–5% based on the resin, solidified products of better water-resistance can be obtained. However, the content of the resin particles in the 200-liters steel drum can may be increased to only 60–70 liters, and thus, there is no substantial improvement in the volume reduction.

From the view to eliminate the cause of swelling of the resin particles, it has been tried to coat the surface of the particles with water-resistant material such as a polyester. This was found effective, but the process will be more complicated due to the use of organic materials.

SUMMARY OF THE INVENTION

The object of the present invention is, in view of the present status of technology, to establish and provide, in the treatment of the spent ion exchange resins by cement solidification, a process which enables increase in the content of the resin particles in the solidified product without lowering the water resistance of the solidified product, thus contributing to increase of the volume-reduction and cutting down of the treatment costs.

The cement solidification treatment of the spent ion exchange resins of the present invention comprises dehydrating the wet resin particles to remove free water therefrom; applying a small amount of cement powder thereon under stirring as a pre-treatment to coat the surface of the resin particles with the cement powder; then, adding cement powder and water, and kneading to form a uniform mixture; and finally casting the mixture or cement paste into a vessel to solidify the mixture therein.

The cement may be selected from portland cement and mixed cement, i.e., a mixture of portland cement with one or more other hydraulic materials.

The free water separated at the step of dehydrating the wet spent ion exchange resin can be used as a portion of the water for mixing and kneading. This is a preferable embodiment because the problem of disposing the separated water can be solved at once.

DETAILED EXPLANATION OF PREFERRED EMBODIMENTS

Figure 1:
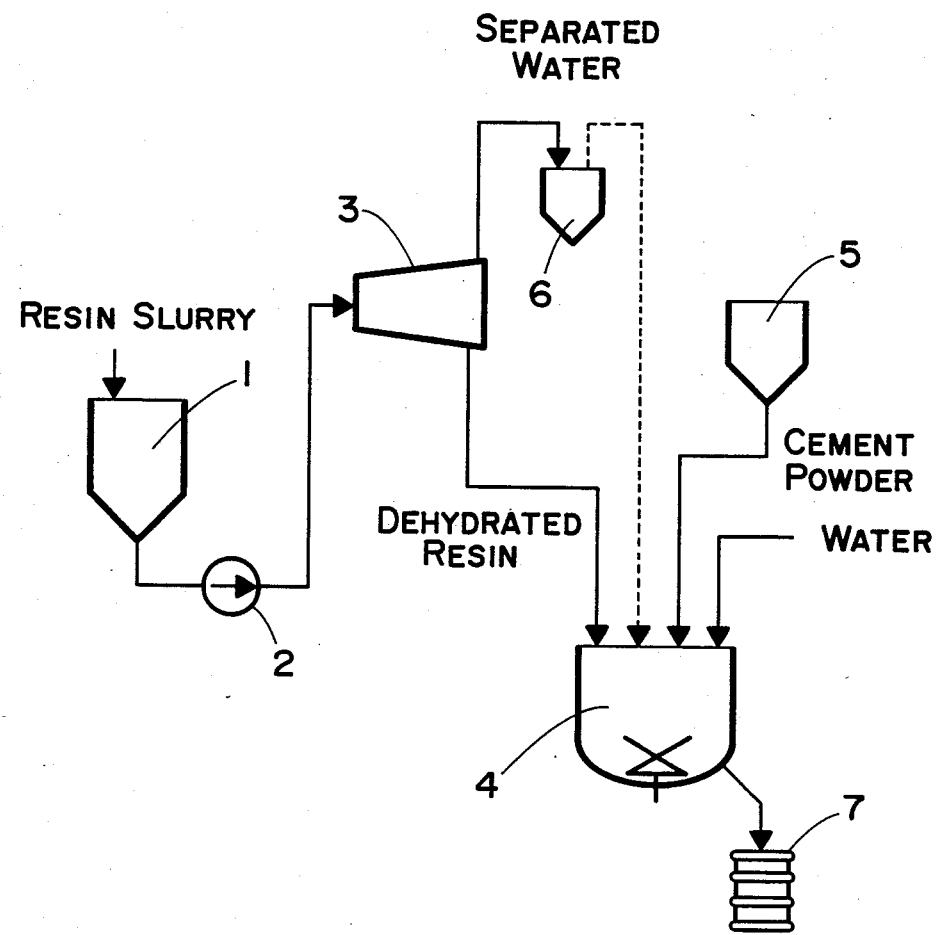
FIG. 1 is a flow chart showing the process of the present invention.

The process of the present invention is now explained with reference to the attached drawings. As shown in FIG. 1, the spent ion exchange resin or resins are stored in resin tank 1 in the form of slurry containing a considerable amount of water. The resin slurry is transferred by slurry pump 2 to dehydrator 3, where it is centifuged to remove the free water. The dehydrated resin particles are then forwarded to kneaded 4. A small amount of portland cement powder from cement hopper 5 is thrown in the kneader, and stirrer at the bottom of the kneader 4 is rotated for 5 to 15 minutes to stir well the resin particles and the cement powder. The cement powder reacts with water which adhered on the surface of the resin particles or contained in the particles, and hydration occurs. Thus, the surface of the resin particles will be gradually coated with the hydrated cement. It is preferable to stand still the mixture for a few hours until the hydration proceed to some extent.

Then, the resin particles which were subjected to the above treatment receive addition of a suitable amounts of portland cement powder and water, and the stirrer is operated again for 10 minutes or so to form the cement paste. The kneaded mixture or the cement paste is cast into an appropriate vessel 7 such as a steel drum can to solidify. Thus, the treatment process is completed.

Figure 3:
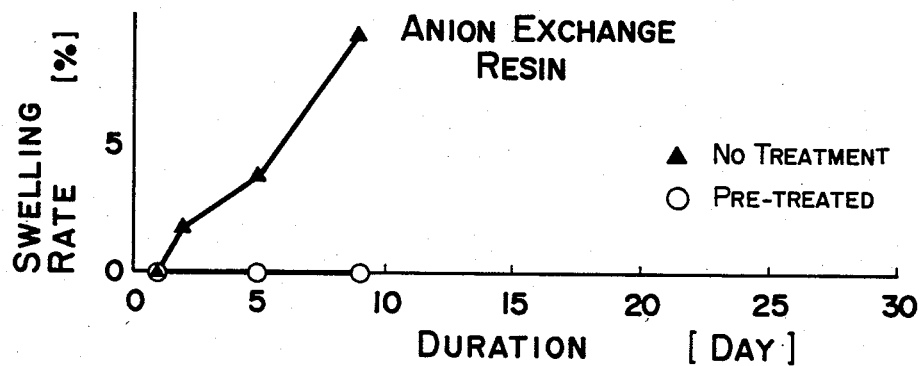
Figure 4:
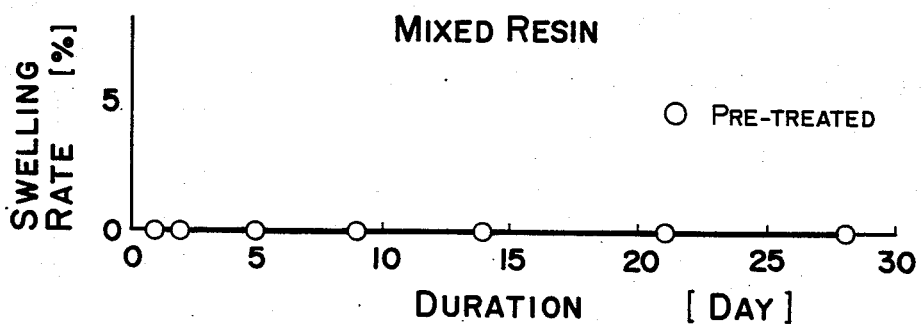

The solidified products obtained by the present solidification treatment process exhibit good water-resistability. Examples prepared by the present process and the conventional process both containing 10% (dry basis) of resin particles were immersed in water, and the swelling rates were observed. The results are shown in FIG. 2 to FIG. 4.

Figure 2:
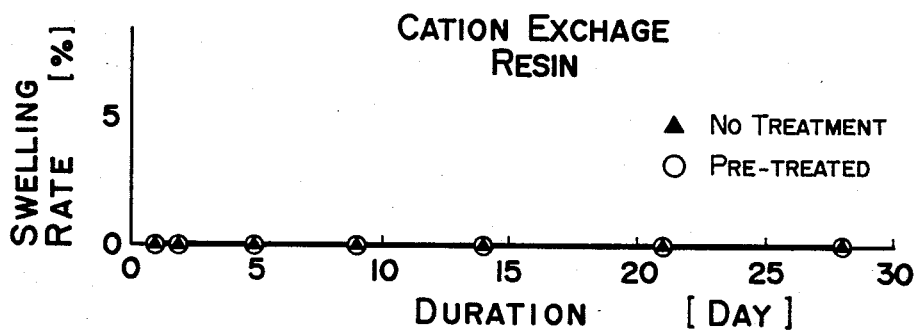
FIG. 2 to FIG. 4 are the graphs showing the swelling rates of the cement solidified products of different ion exchange resins when immersed in water in comparison with solidified products according to the conventional process.

As seen from FIG. 2, solidified products of cation exchange resin particles do not expand even if they were solidified without being pre-treated according to the present process. On the other hand, solidified products of anion exchange resin particles without the pre-treatment of the present invention expand significantly as seen in FIG. 3. However, no substantial expansion is observed in the solidified products according to the present invention. With respect to the solidified products of the mixed resin, which are practically used for the above mentioned treatment of the waste water, FIG. 4 shows the effect of the pre-treatment according to the present process.

Thus, the present invention eliminates the causes of expansion of the solidified products when immersed in water, and enables increased content of the resin in the solidified products when compared with the solidified products prepared by the conventional process. This results in lowering the amount of the waste matters to be disposed.

The present process is simple, and therefore, can be carried out by using conventional cement solidification equipments. Costs for the treatment are substantially equal to those of the prior art.

EXAMPLE 1

Content of ion exchange resin: 10% (dry basis)

Slurry of anion/cation mixed resin (Diaion SMN 1) was centrifuged for dehydration to give 40 liters of the resin particles, which were put in a kneader of capacity 150 liters and received ordinary portland cement powder 3 kg. The stirrer at the bottom of the kneader was operated for about 10 minutes, and the mixture was left alone for 20 hours. Then, under stirring, water 28 liters and ordinary portland cement powder 108 kg were charged in the kneader, and after kneading for 10 minutes, the kneaded paste were cast in a 100-liters steel drum can.

Test pieces were prepared with a portion of the kneaded paste by casting it in the cases, and cured in wet air or in water. Compressive strength of them was measured in accordance with the method standardized in JIS R5201. For the purpose of comparison, test pieces were also prepare for the cases of no pre-treatment of applying cement powder, and also subjected to the compression test. The results on both the test pieces are shown in Table 1.

TABLE I

| Cement Pre-treatment | Specific Gravity | Curing in Wet Air (kg/m2) | | Curing in Water (kg/cm2) | |
|---|---|---|---|---|---|
| | | 1 month | 3 month | 1 month | 3 month |
| Yes | 1.7 | 295 | 320 | 290 | 319 |
| No | 1.7 | 77 | 166 | * | * |

*measurement impossible due to cracks in the test piece

EXAMPLE 2

Content of ion exchange resin: (dry basis) 15%

Dehydrated mixed resin (Diaion SMN 1) particles 60 liters was charged in a kneader of capacity 150-liters, and ordinary portland cement powder 4.5 kg was added thereto. Subsequent operation was carried out the same as Example 1, water for kneading was 24 liters, and portland cement powder, 92 kg.

The measured compressive strength of the solidified products is shown in Table II.

In this example, 120 liters of resin particles was contained in one 200-liters steel drum can. The volume reducing ratio was 1200/120=1.7, and the volume reduction was almost doubled in comparison with the conventional cement solidification.

TABLE II

| Cement Pre-treatment | Specific Gravity | Curing in Wet Air (kg/m2) | | Curing in Water (kg/cm2) | |
|---|---|---|---|---|---|
| | | 1 month | 3 month | 1 month | 3 month |
| Yes | 1.6 | 128 | 177 | 152 | 217 |

What is claimed is:

1. A process for cement solidification treatment of spent ion exchange resins, which comprises dehydrating the wet resin particles to remove free water therefrom; applying a small amount of cement powder thereon under stirring as pre-treatment to coat the surface of the resin particles with the cement powder; then, adding cement powder and water to the pre-treated resin particles and kneading to form a uniform mixture of cement past; and finally casting the cement paste into a vessel to solidify it therein.

2. A process for cement solidification treatment according to claim 1, wherein the cement is selected from the group consisting of portland cement and a mixture of portland cement with at least one other hydraulic material.

3. A process for cement solidification treatment according to claim 1, wherein the free water separated at the step of dehydrating the wet spent ion exchange resin is used as a portion of the water for kneading the mixture.

4. A process for cement solidification treatment according to claim 1, wherein the spent ion exchange resins include anion exchange resins.

5. A process for solidification treatment of spent ion exchange resins, which comprises:
dehydrating wet spent ion exchange resin particles,
coating the surface of the resulting dehydrated particles with a small amount of cement powder by adding a small amount of the cement powder to the dehydrated particles and stirring,
adding cement and water to the resulting cement coated particles and kneading the resulting mixture into an uniform mixture, and
solidifying the uniform mixture by casting in a vessel.

6. A process for cement solidification treatment according to claim 5, wherein the wet spent ion exchange resin particles include anion exchange resin particles.

* * * * *